Figure 1:
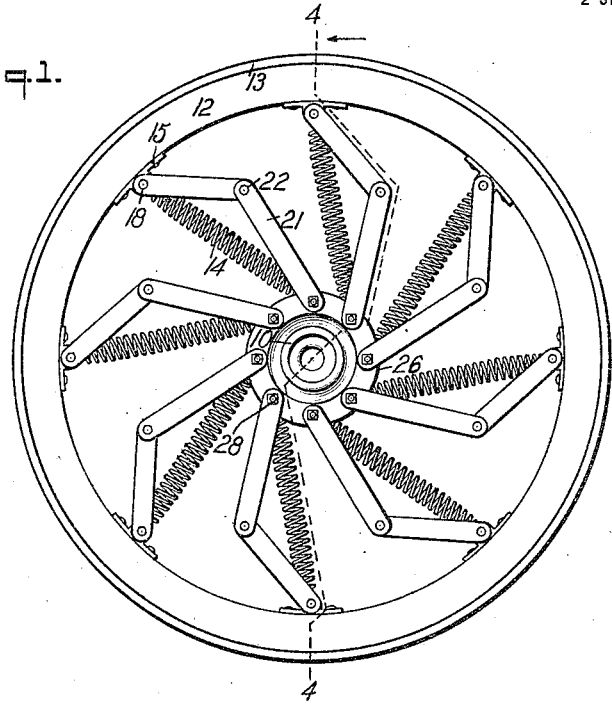

J. C. KOCH.
SPRING WHEEL.
APPLICATION FILED JAN. 29, 1916.

1,182,689.

Patented May 9, 1916.
2 SHEETS—SHEET 1.

WITNESSES

INVENTOR
Julius C. Koch
BY
ATTORNEYS

J. C. KOCH.
SPRING WHEEL.
APPLICATION FILED JAN. 29, 1916.
1,182,689.
Patented May 9, 1916.
2 SHEETS—SHEET 2.
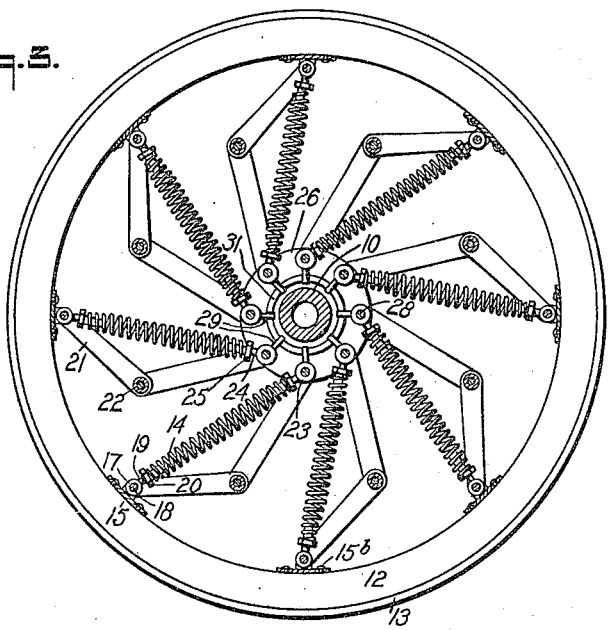
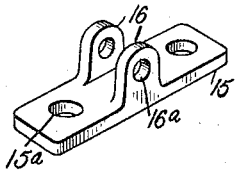
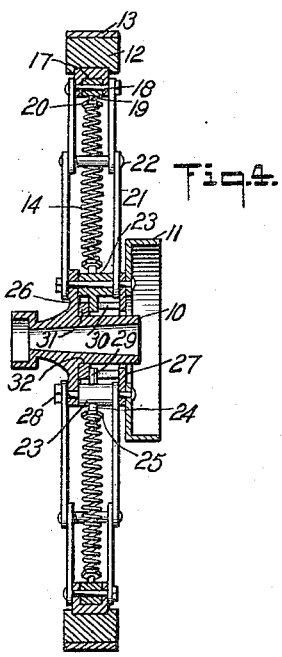
WITNESSES
INVENTOR
Julius C. Koch
BY
ATTORNEYS

UNITED STATES PATENT OFFICE.

JULIUS CARL KOCH, OF TOWER CITY, NORTH DAKOTA.

SPRING-WHEEL.

1,182,689.

Specification of Letters Patent.

Patented May 9, 1916.

Application filed January 29, 1916. Serial No. 75,010.

*To all whom it may concern:*

Be it known that I, JULIUS C. KOCH, a citizen of the United States, and a resident of Tower City, in the county of Cass and State of North Dakota, have invented a new and Improved Spring-Wheel, of which the following is a full, clear, and exact description.

An object of my invention is to provide a spring wheel, in which the felly is resiliently connected with the hub in such a manner that the springs of the wheel will yield to a partial turning of the felly relative to the hub, and thereby absorb the shock of a sudden stop or start.

A further object of the invention is to provide, in a wheel of the class referred to, a novel manner of forming and arranging the springs and appurtenant elements, with a view to distribute to all the springs, a movement of one or more springs due to a relative movement of the felly and hub in the plane of the wheel.

The invention also has for its object to promote strength and durability of construction, as well as simplicity in assembling and adjusting the parts.

The invention will be particularly explained in the specific description following.

Reference is to be had to the accompanying drawings forming a part of this specification in which similar reference characters indicate corresponding parts in all the views.

Figure 2:
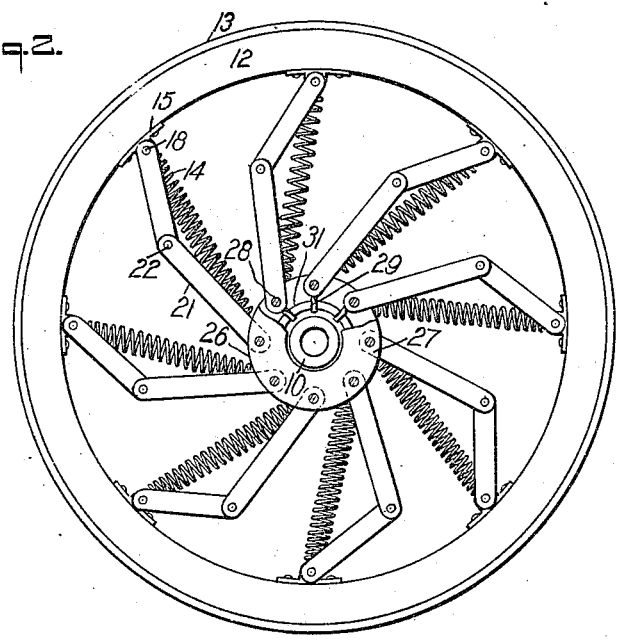

Figure 1 is a side view of the wheel; Fig. 2 is a similar view from the opposite side of the wheel, the brake-drum being omitted and a portion of a ring at the inside of the brake-drum being broken away; Fig. 3 is a vertical section taken in the plane of the wheel; Fig. 4 is a transverse section on the line 4—4, Fig. 1; Fig. 5 is a perspective view of the attaching plate for the outer ends of the springs.

My improved wheel includes a hub 10, arranged in connection with which is a brake-drum 11, secured in a manner hereinafter described. A separate felly 12 is employed, which is provided with a metallic tire 13.

Between the hub and the felly, spiral springs 14 are arranged at an angle to radial lines. The outer end of each spring is secured to the felly 12, for which purpose there is shown, in the illustrated example, a securing plate 15, said plate having holes $15^a$ to receive screws $15^b$, or the like. Said plate 15 has spaced ears 16 and alined holes $16^a$, through which a transverse bolt or pin 18 extends. On said bolt 18 an element 17 is rockably mounted. The several rockable elements 17 are formed, at the inside, with pins 19 that extend into the outer ends of the respective springs 14. On the pins 19, flanges or equivalent members 20 may be provided, against which the outer ends of the springs abut.

Adjacent to each spring, links 21 are arranged as spokes, and between the hub 10 and the felly 12, the links being disposed in pairs at the sides of the wheel and articulated as at 22. The outer ends of the links are pivotally connected with the felly, preferably through the medium of the bolts 18.

The inner ends of the springs 14 and the inner ends of the links 21 are connected with the hub in the following manner: Rockable elements 23 are disposed about the hub 10, one for each spring 14, and present outwardly disposed pins 24, which extend into the inner ends of the said springs. The pins have flanges or equivalent elements 25 thereon, against which the inner ends of the springs abut. The hub 10, at one side, has an integral radial flange 26 and, at the opposite side of the wheel from the flange 26, and parallel therewith, is a separate flat ring 27. Bolts 28 extend transversely through the brake-drum 11, through the ring 27, which is adjacent to and at the inside of said drum, through the elements 23, and through the hub flange 26, thereby securing the brake-drum and ring 27 in position and rockably mounting the elements 23. Each rockable element 23 is formed with a second pin 29 projecting radially inward, or approximately so, and said pins 29, of the several elements 23, are accommodated in slots 30 formed in a loose ring or sleeve 31, which is free to turn on the hub 10, between the hub flange 26 and the ring 27. The sleeve 31, for its major portion, may be spaced from the hub 10 and have a contracted diameter at one end as at 32 to snugly embrace the hub.

By the described construction, the springs 14 are disposed oblique to the radial pins 29 and the felly, being free to have a limited movement in the plane of the wheel relative to the hub. In the case of a sudden stop the creeping or relative movement of the felly will result in compressing the springs 14 and the tension of the springs, through the medium of the pins 29, will give a slight turn to the sleeve 31. The result will be that any shock of suddenly stopping the vehicle will be largely absorbed by the springs. Furthermore, a compression of a particular spring, or springs, at the bottom of the wheel, due to relative displacement of the felly in an upward direction under the weight of the car or in response to shock, will be distributed to the several springs about the wheel, since any compression or shock on one spring will be distributed to all the springs through the medium of their connection with the loose ring 31.

Having thus described my invention I claim as new and desire to secure by Letters Patent:

1. A spring wheel including a hub having a radial flange, a separate felly, a series of spiral springs disposed between the hub and felly at an angle to radial lines, a separate ring on the hub at the opposite side of the wheel from the hub flange, bolts extending transversely through said flange and ring, rockable elements on said bolts between the flange and the ring, said elements having outwardly disposed pins engaged by the inner ends of the said springs, and having inwardly disposed pins, a sleeve loose on the hub within the said rockable elements, said sleeve having slots receiving the said inwardly disposed pins, articulated links pivotally secured at their inner ends by said transverse bolts, and means to secure the outer ends of the springs and the outer ends of the links to the felly.

2. A spring wheel including a hub, a felly, a series of springs and a corresponding series of articulated links, disposed between the hub and felly, means to secure the springs and links at their outer ends to the said felly, and means to secure the inner ends of the links and spring; said last-mentioned means including elements rockably mounted about the hub, and a ring loose on the hub within the said rockable elements having outwardly disposed pins engaged by the said springs, and inwardly disposed pins engaged by the said loose sleeve.

In testimony whereof I have signed my name to this specification in the presence of two subscribing witnesses.

JULIUS CARL KOCH.

Witnesses:
H. H. VOWLES,
D. E. VOWLES.

Copies of this patent may be obtained for five cents each, by addressing the "Commissioner of Patents, Washington, D. C."